UNITED STATES PATENT OFFICE.

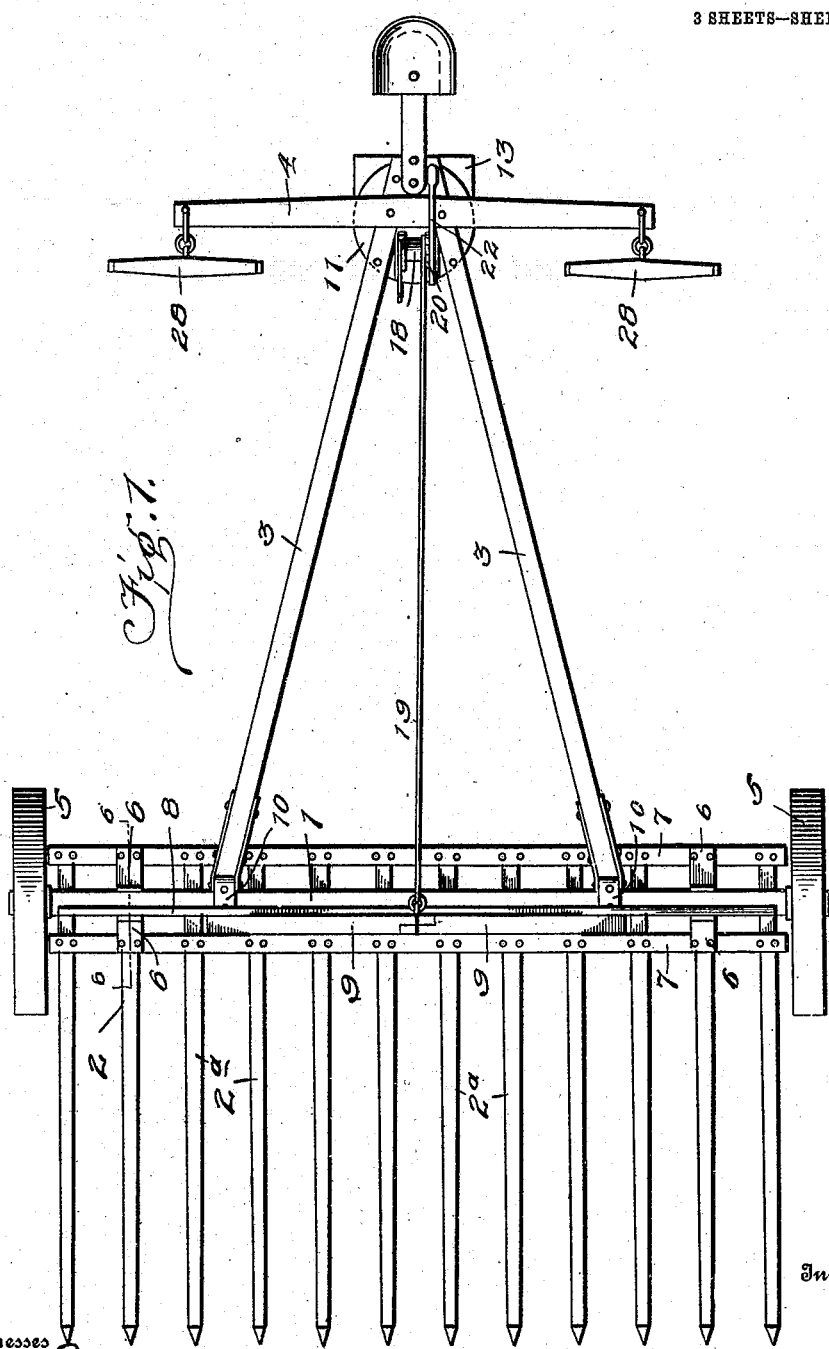

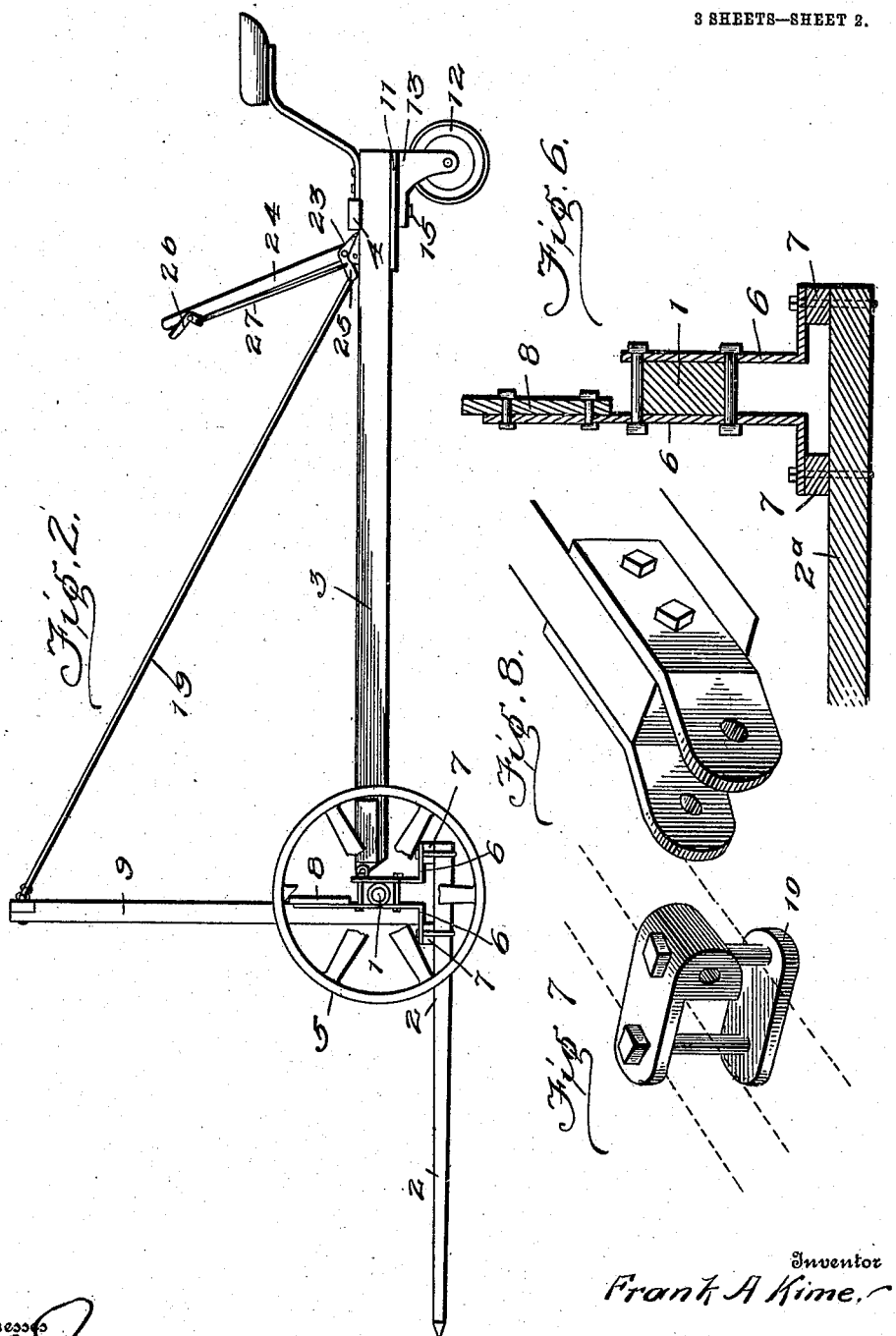

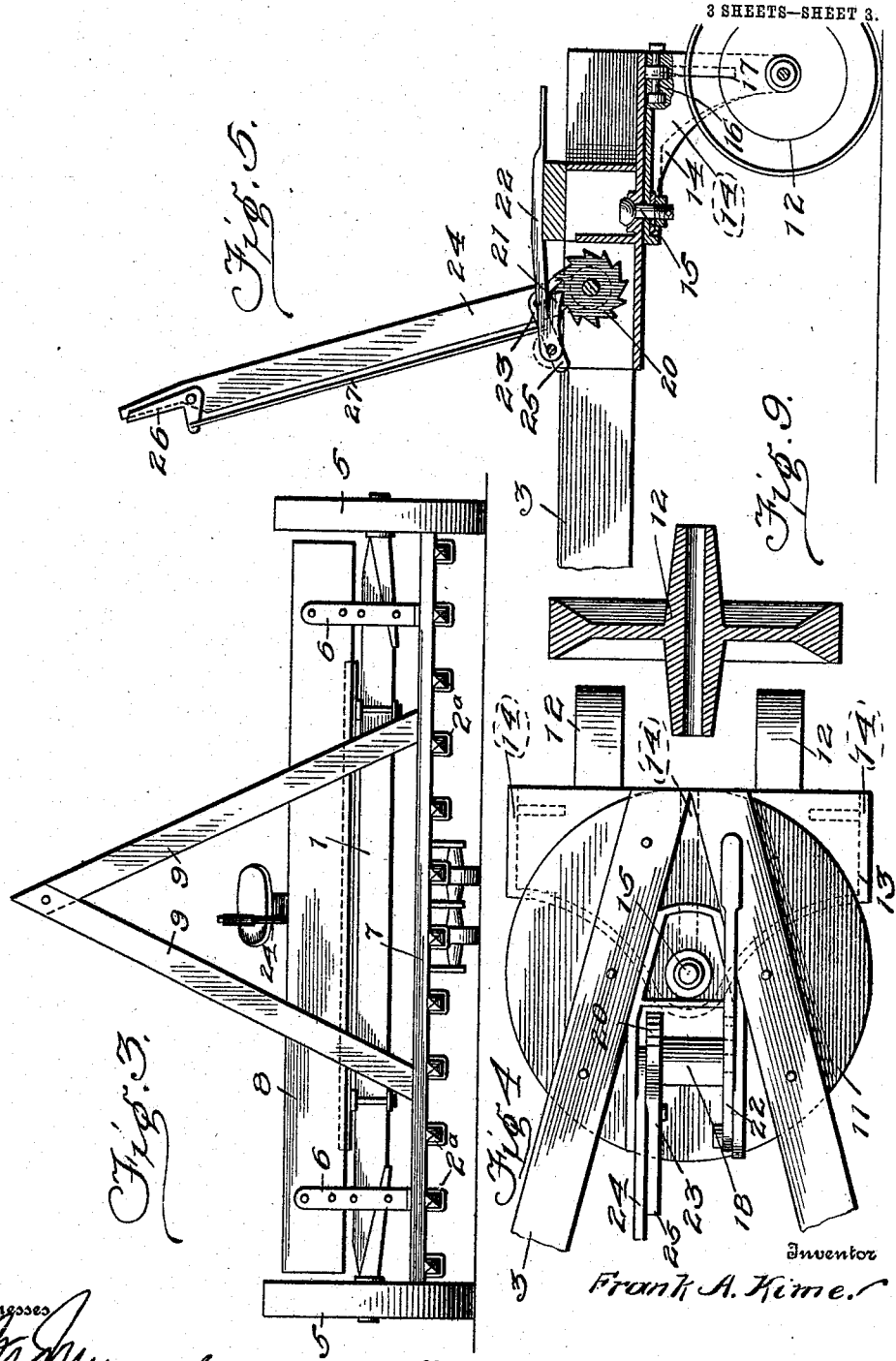

FRANK A. KIME, OF BAKER CITY, OREGON.

HAY-TRUCK.

No. 908,106.  Specification of Letters Patent.  Patented Dec. 29, 1908.

Application filed March 18, 1908. Serial No. 421,924.

*To all whom it may concern:*

Be it known that I, FRANK A. KIME, citizen of the United States, residing at Baker City, in the county of Baker and State of Oregon, have invented certain new and useful Improvements in Hay-Trucks, of which the following is a specification.

The present invention relates to an improved hay truck and has for its object to provide a device of this character embodying novel means for engaging the hay and elevating the same above the ground during transportation.

The invention further contemplates a hay truck in which the fork is peculiarly mounted so as to be disposed below the axle when in operative position, thereby enabling comparatively large wheels to be employed upon the truck with the result that the latter will pass readily over ruts and hollows into which smaller wheels would sink.

For a full understanding of the invention and the merits thereof and also to acquire a knowledge of the details of construction and the means for effecting the result, reference is to be had to the following description and accompanying drawings, in which:

Figure 1 is a plan view of a hay truck embodying the invention. Fig. 2 is a side elevation of the same. Fig. 3 is a front end view of the truck. Fig. 4 is an enlarged top plan view of the rear end of the truck, the seat and draft beam being removed. Fig. 5 is an enlarged longitudinal sectional view through the rear end of the truck. Fig. 6 is a sectional view through the hay rake on the line 6—6 of Fig. 1. Fig. 7 is a detail view of one of the clips by means of which the reach is connected to the front axle. Fig. 8 is a detail view of the forward end of one of the reach sections. Fig. 9 is a sectional view through one of the caster wheels at the rear end of the truck.

Corresponding and like parts are referred to in the following description and indicated in all the views of the drawings by the same reference characters.

The improved hay truck comprises essentially a front axle 1 which carries a hay rake 2, a reach 3 being provided which projects rearwardly from the axle, the end of the reach being supported by caster wheels and having a transverse beam 4 rigidly applied thereto for the purpose of receiving the draft. The front axle 1 is provided at its extremities with the usual spindles upon which the supporting wheels 5 are journaled, and the hay fork 2 which is pendent from the axle when in operative position is rigidly connected thereto by means of the hangers 6. Specifically describing the fork it will be observed that the same comprises a plurality of spaced and parallel tines $2^a$ having their rear ends connected by U bolts or other suitable fastening members to a pair of transverse bars 7. The hangers 6 comprise front and rear angular brackets which project upwardly upon both sides of the axle 1 and are rigidly secured thereto, the front brackets extending upwardly above the axle and having a transverse strip 8 attached thereto. A pair of upwardly converging bars 9 are also located at the rear end of the tines and are secured both to the axle and the transverse strip 8, and coöperate with the latter to form a back for the rake.

The reach 3 is formed of a pair of longitudinal beams converging toward their rear ends and having their forward extremities pivotally connected to clips 10 upon the front axle 1. A plate 11 which in the present instance is circular in shape is applied to the rear end of the reach and pivotally connected to this plate is a frame carrying the caster wheels 12. This frame comprises a second plate 13 bearing against the lower face of the plate 11 and provided with the downwardly projecting brackets 14 between which the caster wheels are journaled. The forward portion of the second plate 13 which is located below the plate 11 is pivotally connected thereto by means of a round headed bolt 15, while the rear portion of the plate has a shaft 16 journaled thereon, the said shaft being disposed over the caster wheels 12 and at approximately right angles to the axis thereof and being provided with a roller 17 designed to bear against the upper plate 11 to reduce the friction therewith and permit the wheel carrying frame to swing freely about the bolt 15.

For the purpose of tilting the hay rake a reel 18 is utilized which is journaled above the upper face of the plate 11 and receives a cable 19 connected to the upper portion of the back of the hay rake. A ratchet wheel 20 is provided at each end of the reel 18, one of the ratchet wheels being engaged by a tooth 21 upon a lever 22, the weight of the lever normally holding the tooth in an operative position and the said tooth tending to prevent unwinding of the cable from the reel. The ratchet at the opposite end of the reel is adapted to be engaged by a pawl 23 pivotally mounted upon an operating lever 24 and counterbalanced at 25 so as to normally swing into an inoperative position. A finger-piece 26 is mounted upon the end of the lever 24 and is connected by a rod or link 27 to the pawl 23 so that when the operator grasps the handle of the operating lever the finger-piece is moved to throw the pawl 23 into an operative position. It will thus be apparent that by reciprocating the operating lever 24 back and forth the reel 18 will be revolved so as to wind up the cable 19 and swing the hay rake upwardly, the tines $2^a$ then assuming an approximately vertical position while the back of the hay rake is thrown against the reach. As soon as the operator releases his grasp upon the lever 24 the pawl 23 carried thereby moves into an inoperative position, and the reel can be released by lifting the lever 22 and moving the tooth carried thereby out of engagement with the ratchet wheel. The reel then turns freely and permits the cable 19 to be unwound therefrom and the hay fork to drop into operative position for engaging a shock of hay or the like.

The draft is applied to the transverse beam 4 which is rigidly connected to the rear end of the reach, and for this purpose a swingletree 28 is shown as attached to each end of the said transverse beam. Owing to the fact that this beam 4 is rigid with the reach it will be obvious that the truck will be under the control of the draft animals and can be guided in its movements by the same.

When it is desired to engage a shock of hay the hay fork is swung downwardly so that the tines $2^a$ assume an approximately horizontal position and are disposed below the axle 1. The truck is then driven against the shock so that the tines enter the base of the same. The operator next grasps the lever 24 and reciprocates the same to wind up the cable 19 and tilt the hay fork upwardly so as to elevate the hay away from the ground, in which position it can be readily transported from place to place and again dumped by releasing the lever 22.

Having thus described the invention, what is claimed as new is:

In a hay truck, the combination of an axle, wheels for the axle, a hay fork, hangers applied to the hay fork and comprising brackets which project upwardly therefrom upon opposite sides of the axle and are secured to the axle above the tines of the fork, one of the brackets of each hanger being extended above the axle, a transverse strip secured to the upwardly projecting portions of the brackets, a reach loosely connected to the axle and extending rearwardly therefrom, means for supporting the rear end of the reach, and means for applying draft to the reach.

In testimony whereof I affix my signature in presence of two witnesses.

FRANK A. KIME. [L. S.]

Witnesses:
W. S. BOWERS,
V. E. TRIBOLET.